United States Patent
Clouser et al.

[11] Patent Number: 5,333,115
[45] Date of Patent: Jul. 26, 1994

[54] LINE LEAK TEST APPARATUS RESPONSIVE TO PUMP USE

[75] Inventors: Michael T. Clouser; Laurence S. Slocum, both of Indianapolis, Ind.

[73] Assignee: Emerson Electric Co., St. Louis, Mo.

[21] Appl. No.: 837,093

[22] Filed: Feb. 18, 1992

Related U.S. Application Data

[63] Continuation of Ser. No. 491,107, Mar. 9, 1990, abandoned.

[51] Int. Cl.⁵ .................. G06F 15/20; G01M 3/32
[52] U.S. Cl. .................. 364/558; 73/40.5 R; 222/63; 364/510; 364/551.01
[58] Field of Search ............... 364/177, 179, 182, 184, 364/510, 550, 551.01, 556, 558; 73/1 H, 4 R, 40, 40.5 R, 302, 708, 756; 137/458; 222/52, 59, 61, 63, 71, 73, 74, 75, 636

[56] References Cited

U.S. PATENT DOCUMENTS

| | | | |
|---|---|---|---|
| 4,490,800 | 12/1984 | Powers | 364/558 |
| 4,658,986 | 4/1987 | Freed et al. | 222/63 X |
| 4,686,638 | 8/1987 | Furuse | 364/551.01 X |
| 4,796,466 | 1/1989 | Farmer | 73/40.5 R |
| 4,835,717 | 5/1989 | Michel et al. | 73/708 X |
| 4,852,054 | 7/1989 | Mastandrea | 364/550 |
| 4,979,641 | 12/1990 | Turner | 364/184 X |

*Primary Examiner*—Kevin J. Teska
*Attorney, Agent, or Firm*—Robert F. Meyer; Eric R. Waldkoetter

[57] ABSTRACT

A line leak test probe for use in a liquid storage and dispensing system which includes a pump. A pressure transducer provides a pressure signal to a microprocessor-based test circuit. Various conditions descriptive of the pressure versus time curve while the pump is running, such as the pressure will rise above 20 psi when the pump is turned on, drop when the liquid is dispensed, and rise again when the dispenser is turned off, are stored within a software program in the microprocessor memory. The microprocessor calculates an average pressure to average out noise and artifacts in the pressure, and waits for the pressure to drop 2 psi below the average pressure after the pump has been turned off before performing leak tests in order to give the noise and artifacts time to die down.

11 Claims, 13 Drawing Sheets

LINE LEAK TEST APPARATUS RESPONSIVE TO PUMP USE

This application is a continuation of application Ser. No. 07/491,107, filed Mar. 19, 1990, now abandoned.

BACKGROUND OF THE INVENTION

1. Field of the Invention.

The invention in general relates to line leak test probes which are used in leak detectors which monitor liquid storage and dispensing systems for leaks and more particularly to such a probe which is capable of determining whether or not the pump which pressurizes the system is running and of using this information in optimizing the leak testing procedure.

2. Description of the Prior Art.

Line leak test probes have been used in the petroleum industry for many years. Such line leak test probes generally report to a central monitor which utilizes the leak information to provide warning of leaks and to shut down pumps on lines that are leaking. Such probes have become an essential part of hydrocarbon storage and dispensing facilities since even very small leaks can result in the loss of thousands of dollars in hydrocarbons and the additional expenses of cleanup can be enormous. It is believed that the state of the art of such probes is described in U.S. Pat. No. 4,835,717 issued to Hilary Michel and Laurence S. Slocum which is hereby incorporated by reference. This patent discloses a line leak test probe that includes a microprocessor that is able to distinguish clear cut pressure drops such as those caused by a person opening the dispensing valve before the pump is turned on. However it does not disclose how to distiguish more complicated situations such as the running of the pump and the dispensing of the liquid. Since the running of the pump and the dispensing of the liquid create many large pressure fluctuations and noise, the leak test probe described in the above patent, and all other prior art leak test probes are limited in their ability to detect leaks.

SUMMARY OF THE INVENTION

It is an object of the invention to provide a line leak test probe that overcomes one or more disadvantages of the prior art leak test probes.

It is another object of the invention to provide a line leak test probe that is able to distinguish when the pump is running and when it is shut off.

It is a further object of the invention to provide a line leak test probe that calculates the average pressure while the pump is running.

It is a further object of the invention to provide a line leak test probe that searches for a rise in pressure above the average pressure to determine when the pump has been shut off.

It is yet another object of the invention to provide a line leak test probe that waits for the pressure to settle down after the pump has been shut off before commencing normal testing for leaks.

The invention provides a line leak test probe for use in a liquid storage and dispensing system which includes a pump for pumping the liquid, the probe comprising: pressure transducer means for providing an electrical signal representative of the pressure in a liquid conduit; and leak test means responsive to the electrical signal for testing the system for leaks and for providing an output signal indicative of a leak; said leak test means including: storage means for storing one or more predetermined conditions related to whether or not the pump is in use; and pump use means communicating with the storage means for determining whether or not the pump is in use and for using this information in assisting in testing for leaks. Preferably, the pump use means includes waiting means for waiting until the pressure in the conduit has settled after the pump has been shut off before testing for leaks. Preferably, the pump use means further comprises means for determining the average pressure while the pump is running and the means for waiting comprises means for waiting until the pressure has dropped a predetermined amount below the average pressure before testing. Preferably, the one or more predetermined conditions comprises the condition that the pressure rises above the average pressure. Preferably, the one or more predetermined conditions include the condition that the pressure is greater than a predetermined pressure. Preferably, the line leak test probe further includes means for testing for leaks while the pump is running if the pressure suddenly falls from a first predetermined pressure to a second predetermined pressure.

The line leak probe according to the invention not only is able to eliminate the noise and other pressure artifacts associated with the pump running and thus produce a much more accurate leak determination, but is also able recognize a pressure signature associated with the pump running and distinguish various parts of this signature in order to customize the leak testing to almost an infinite variety of possible signatures. The invention allows the testing to be customized so as to be both accurate for small leaks and fast for large leaks. Numerous other features, objects and advantages of the invention will become apparent from the following detailed description when read in conjunction with the accompanying drawings.

DESCRIPTION OF THE PREFERRED EMBODIMENT

Figure 6:
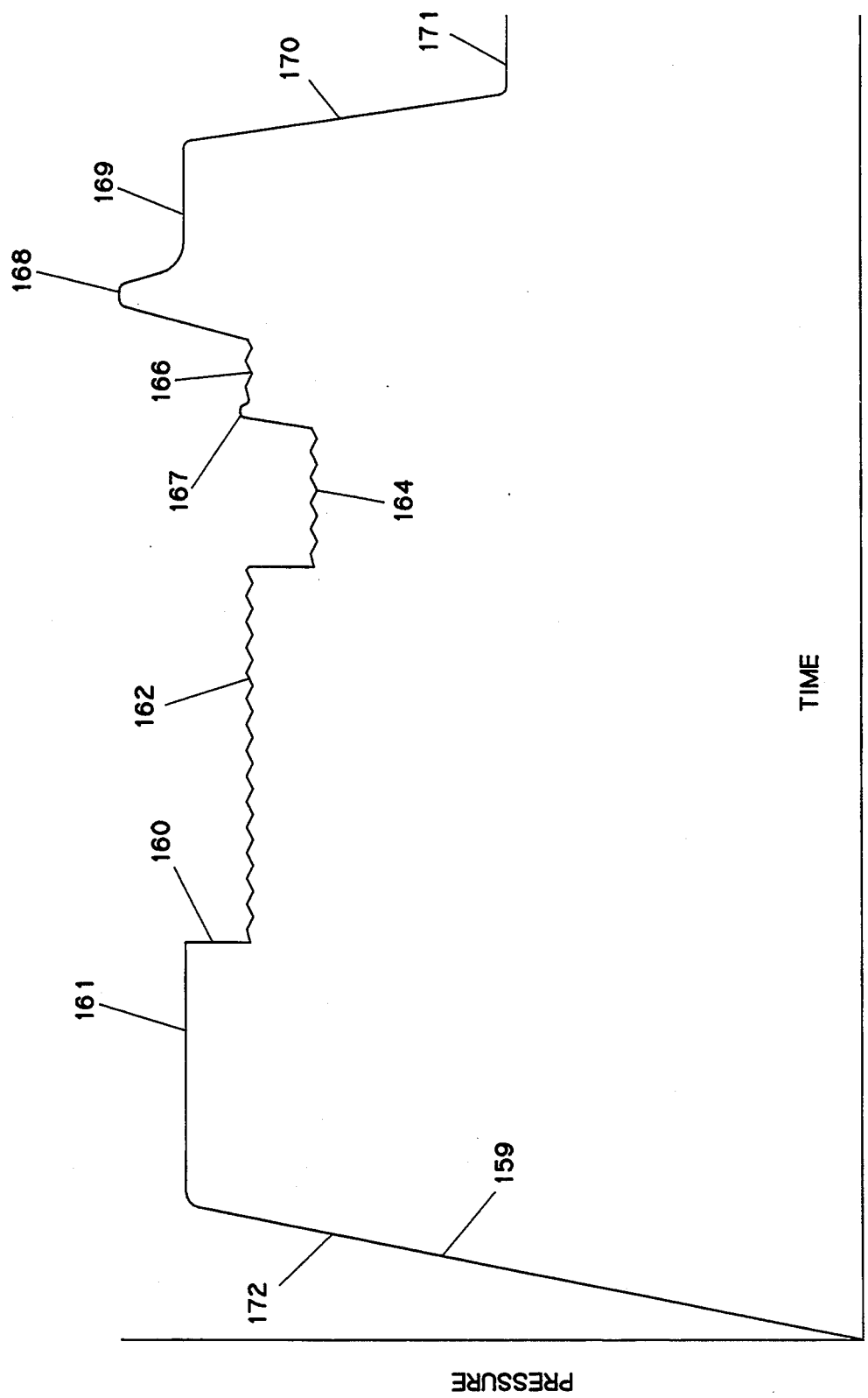
FIG. 6 is an example of a pump signature, i.e. , a pressure versus time curve while the pump is running.
Figure 7:
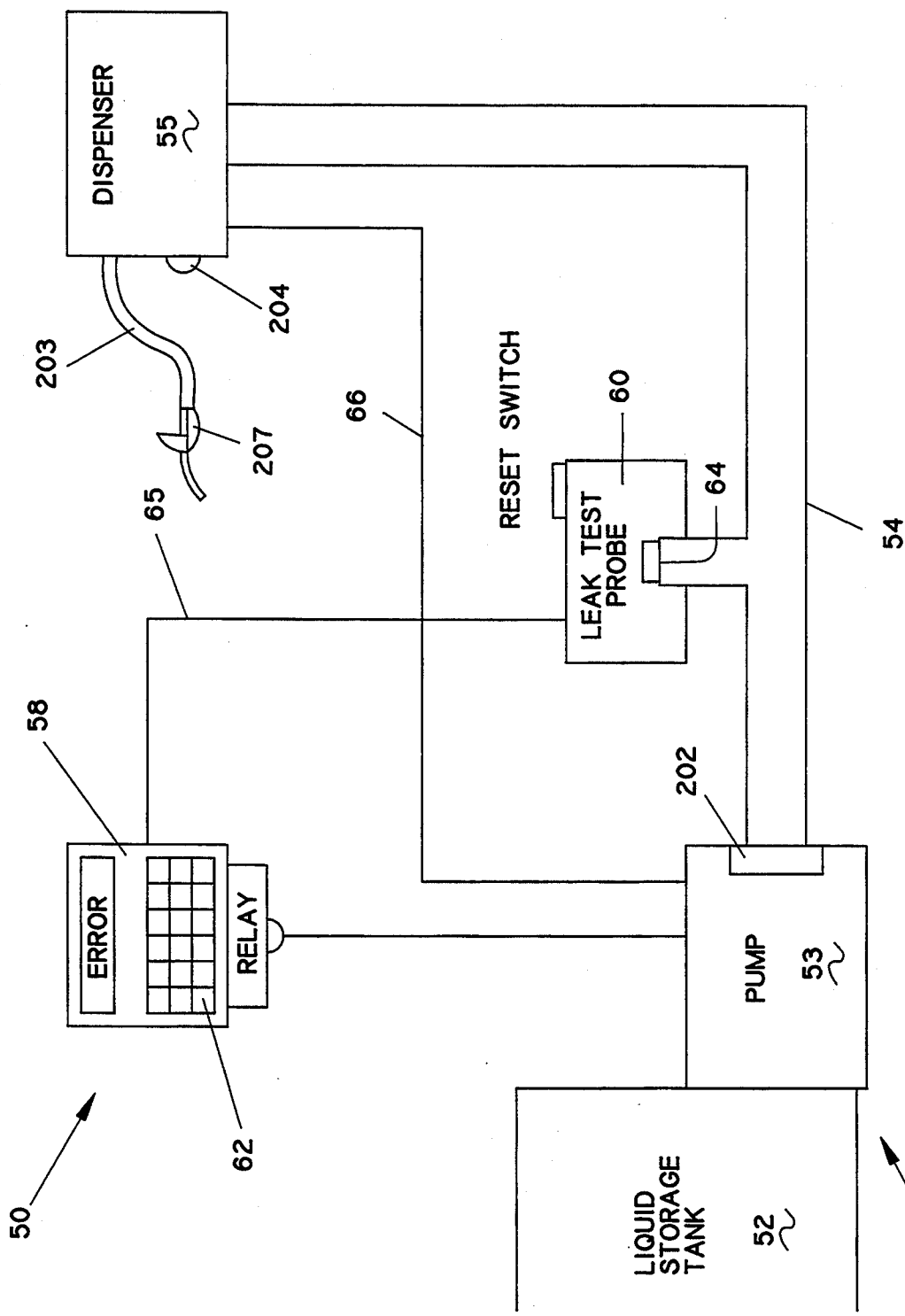
FIG. 7 is a block diagram of the preferred embodiment of a leak detector according to the invention applied to a liquid storage and dispensing system.

Directing attention to FIG. 7, a block diagram of the preferred embodiment of a leak detector 50 according to the invention is shown applied to a liquid storage and dispensing system 51, such as at a gasoline station. The liquid storage and dispensing system 51 generally includes a liquid storage tank 52, a pump 53, at least one conduit 54 and dispenser 55. The pump 53 will generally serve several dispensers, though only one is shown for simplicity. The leak detector 50 includes a central monitor 58 and at least one line leak test probe 60. Generally there will be many probes, and the probes may include external leak test probes (not shown) that underly the entire system 51, probes (not shown) which are internal to the tank 52 and/or conduit 54, as well as other line leak test probes. The monitor is programmable via a keyboard 62 to accomodate the many different probes. The line leak probe 60 is attached to conduit 54 and preferrably includes a pressure transducer 64 which senses the pressure in the conduit. The probe 60 includes a microprocessor 70 based circuit (FIGS. 1A, 1B, and 1C) which is programmed to analyse the pressure to detect leaks in system 51 and, upon the request of the monitor 58, to send an output signal to monitor 58 via cable 65 when a leak is detected. The dispenser 55 communicates with pump 53 via electrical cable 66. The line leak probe 60 according to the invention is able to detect when pump 53 is running, to read the pump signature (FIG. 6), to detect large leaks while the pump is running, and wait to test for smaller leaks until after the pump is shut off. It also communicates other information as appropriate to monitor 58. Monitor 58 may be a monitor as described in U.S. Pat. No. 4,740,777, which is hereby incorporated by reference. The invention primarily involves line leak probe 60, therefore this disclosure will primarily focus on it.

Figure 1A:
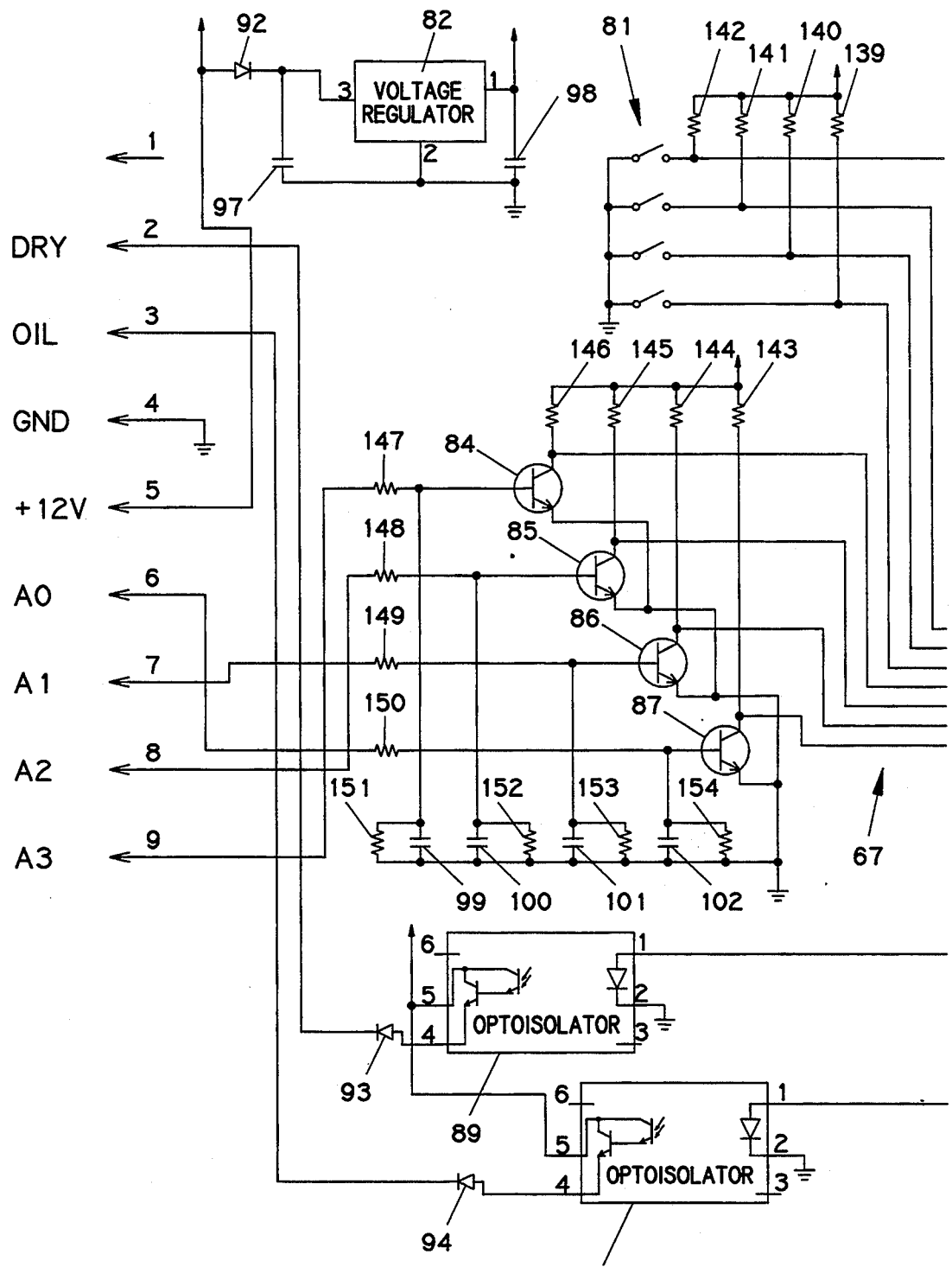
FIGS. 1A through 1C show an electrical circuit diagram of the preferred embodiment of the leak test probe according to the invention.
Figure 1B:
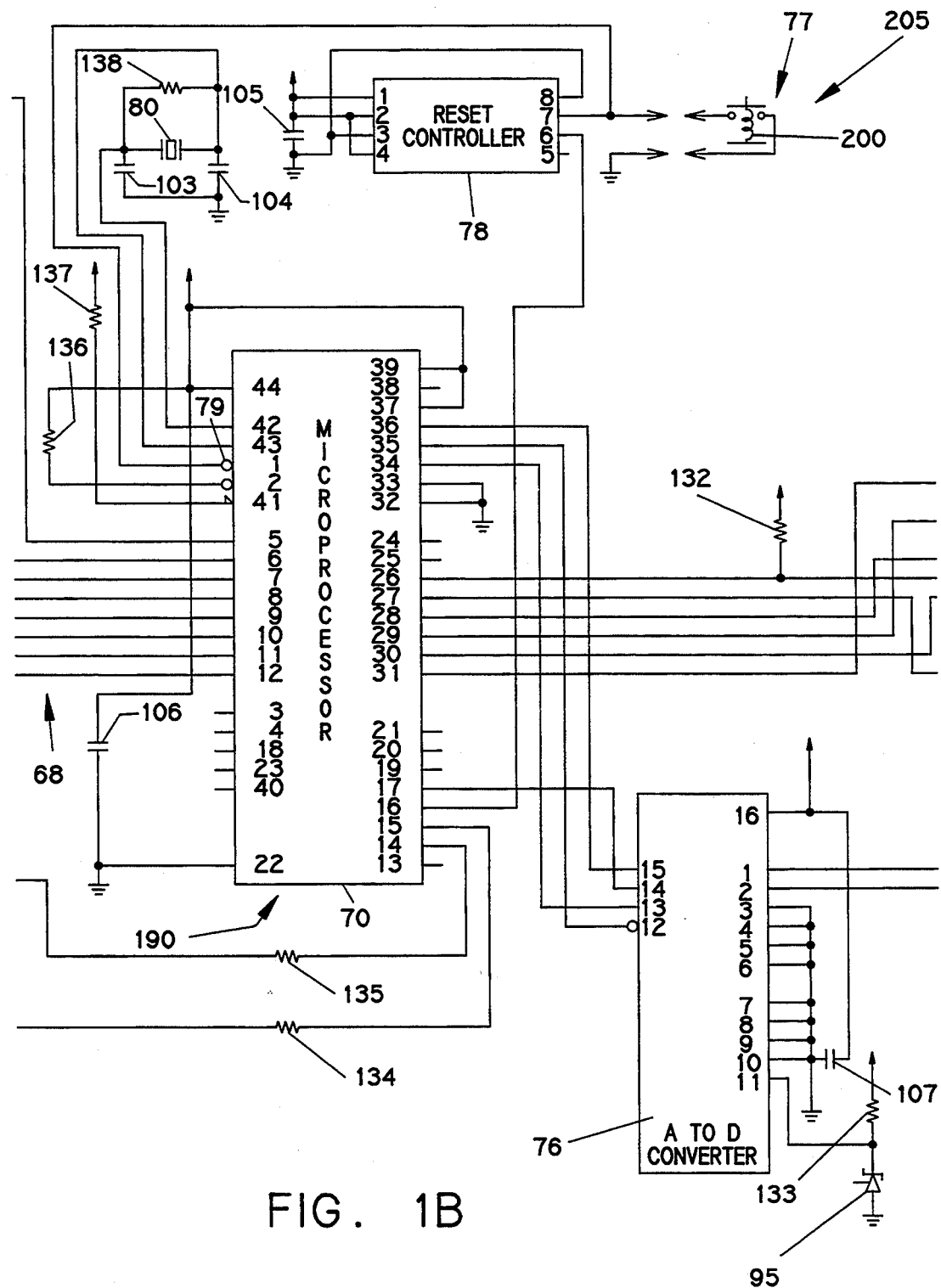
Figure 1C:
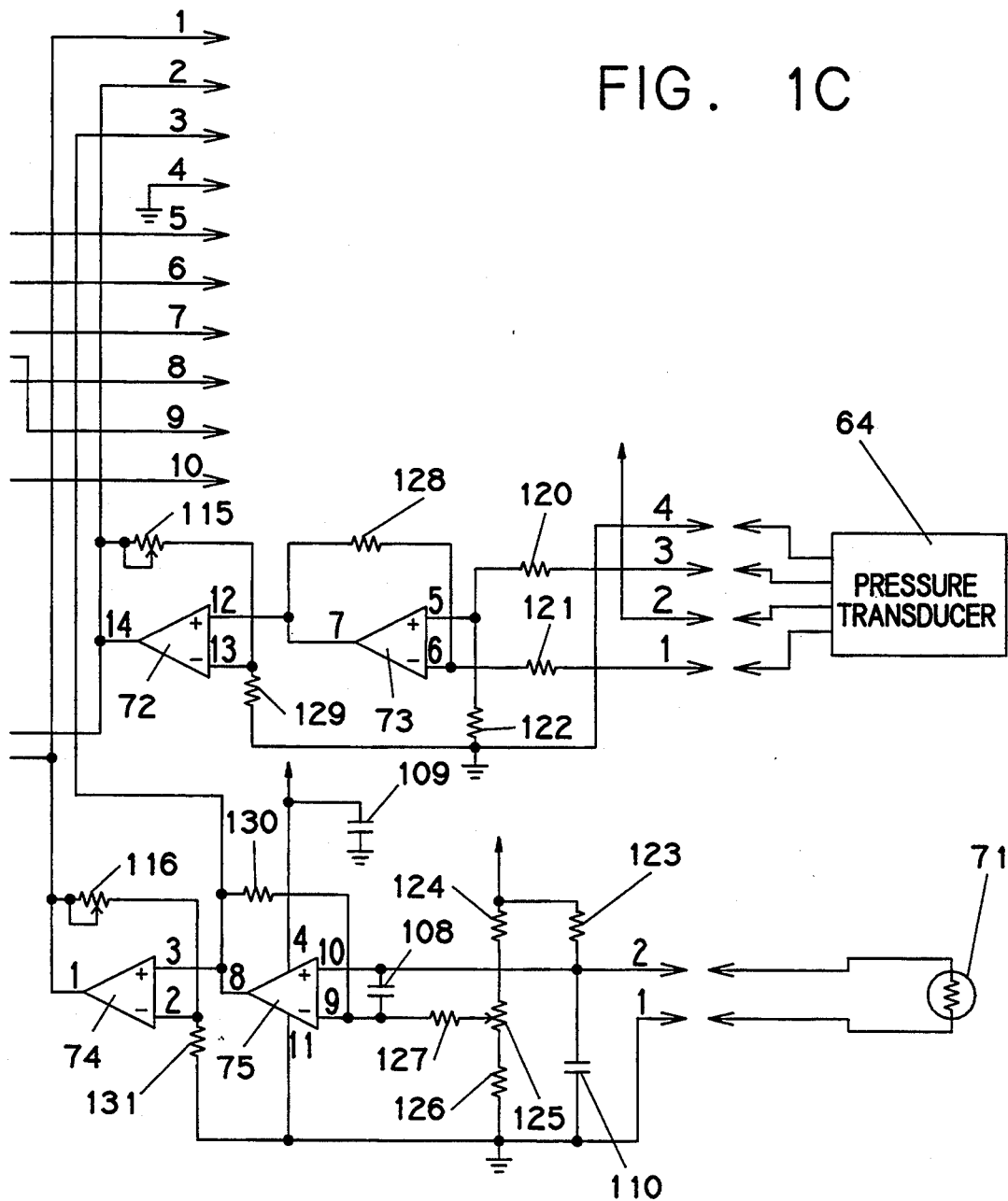

Turning now to a more detailed description of the preferred embodiment of the line leak probe 60, an electrical circuit diagram of the probe 60 is shown in FIGS. 1A through 1C. If FIG. 1A is placed on the left, FIG. 1C is placed on the right, and FIG. 1B is placed between them, the electrical lines, such as 67 in FIG. 1A and 68 in FIG. 1B, align showing the electrical connections between the three FIGS. The electrical circuit includes microprocessor 70 (FIG. 1B), pressure transducer 64 (FIG. 1C), temperature transducer 71, operational amplifiers 72 through 75, A to D converter 76 (FIG. 1B), reset switch 77, watch dog circuit and reset controller 78, oscillator crystal 80, dip switch 81 (FIG. 1A), voltage regulator 82, transistors 84 through 87, optoisolators 89 and 90, diodes 92 through 94, high precision voltage reference diode 95 (FIG. 1B), capacitors 97 through 110, variable resistors 115 and 116, and resistors 120 through 154. The numbers on or next to the inputs and outputs of the microprocessor 70 and the various other chips are the pin numbers of the chips. The detailed connections between the various parts will not be discussed except to point out differences between the preferred circuit shown and that disclosed in U.S. Pat. No. 4,835,717. The connections are also shown in the drawings and will be clear from the functions to be discussed. In the present embodiment, the dip switches 81 which determine the probe number and the monitor 58 input lines A0 through A3 are connected to the microprocessor terminals Nos. 5 through 12 rather than across a comparator. Here the microprocessor 70 does the comparing of the signals on the lines rather than the comparator. The input lines are also connected to the microprocessor 70 through transistors 84 through 87 which perform a level translation function, stepping down the input voltage from the 0 to 12 volts of the monitor 58 to the 0 to 5 volts of the microprocessor 70. Another difference is that the present circuit includes only two output lines, dry and oil, connected to the microprocessor 70 via two optoisolators 89 and 90. The dry output provides the normal indication while the oil output provides the leak indication. This circuit also includes watchdog circuit and reset controller 78 which periodically checks an input from the microprocessor 70, and if the input is not as it should be, hard resets the microprocessor 70. In the preferred circuit the microprocessor 70 is a motorola MC68HC705C4CFN, the A to D converter 76 is an LTC1093, watchdog circuit 78 is a MAX69DEPA, crystal 80 is a 4MHZ crystal, operational amplifiers 72 through 75 are LT1079's, pressure transducer 64 is a Foxbore TM type 1221-07-G-K-4-L or similar type, and temperature sensor 71 is an Amperex TM type KTY81-110 or similar type. An important difference between this circuit and the circuit in U.S. Pat. No. 4,835,717 is that the reset switch 77 connects to the No. 1 pin of the microprocessor 70 which is the reset input and the signal is inverted before being applied to the pin. With this connection, the reset button will turn the microprocessor off when it is pushed and reset it when released.

Turning now to FIGS. 2 through 5C, a flow chart showing the preferred embodiment of the software programming of the microprocessor 70 is shown. It is helpful in understanding the flow chart to break it down into four subparts, a Pump portion shown in FIG. 2, a Catastrophic Test portion shown in FIGS. 3A and 3B, a Gross Test portion shown in FIGS. 4A and 4B, and a Precision Test portion shown in FIGS. 5A, 5B, and 5C, although it should be understood that this software functions as a whole with the various portions interacting with one another as indicated. It should also be understood that in addition to the functions described in the flow charts, the programming also contains clock functions, interrupts, output functions, and other functions which are described more thouroughly in U.S. Pat. No. 4,835,717

Before going on to the programming and operation of the line leak probe 60, we turn to FIG. 6 to discuss a typical pressure versus time curve generated when the pump is used. This curve is referred to herein as the pressure signature of the pump. It will depend on many factors, including, of course, the pump and conduits. A typical pump 53 will pressurize the system at about 26 to 30 psi if no dispenser 55 is operating and there are no leaks. When pump 55 is turned on the pressure rises along the slope 159. This slope will depend on the amount of air in the line. The inertia of the liquid will cause the initial surge of pressure to overshoot its eventual equilibrium pressure of 26 to 30 psi at peak 160. The pressure will then decrease to the equilibrium value at 161. If a dispenser is used the pressure will drop and reach another equilibrium at 162. There will generally be much noise and artifacts in the curve when liquid is being dispensed. This is due to the flows being changed by the user, the energizing of the pump 53, the flow being stopped, hoses 203 being manipulated, etc. If a second dispenser is turned on, the pressure will drop again, as at 164. When one of the dispensers is turned off, the pressure will rise, as at 166. Each rise will include an overshoot, as at 167. When the last dispenser is turned off, the curve will once again overshoot the 26 to 30 psi level at 168. The pressure will then come down to the 26 to 30 psi equilibrium level at 169. When the pump is turned off, the pressure will drop along slope 170. The slope 170 will again depend on the amount of air in the line, being steeper with little air and more gradual with more air. Finally, if there are no leaks, the pressure will level off at a level 171 which is dependent on the check valve 202 in the pump, typically a value between 8 and 14 psi. A typical liquid storage and dispensing system may contain six or eight dispensers. Each dispenser may be run at almost an infinite variety of flow rates. Thus there is an infinite variety of different possible pump signature curves. At a busy gasoline station, a curve may continue for hours at a time, with dispensers cutting in and out as customers fill their vehicle tanks or other use of the dispenser 55 depending on the application.

Figure 2:
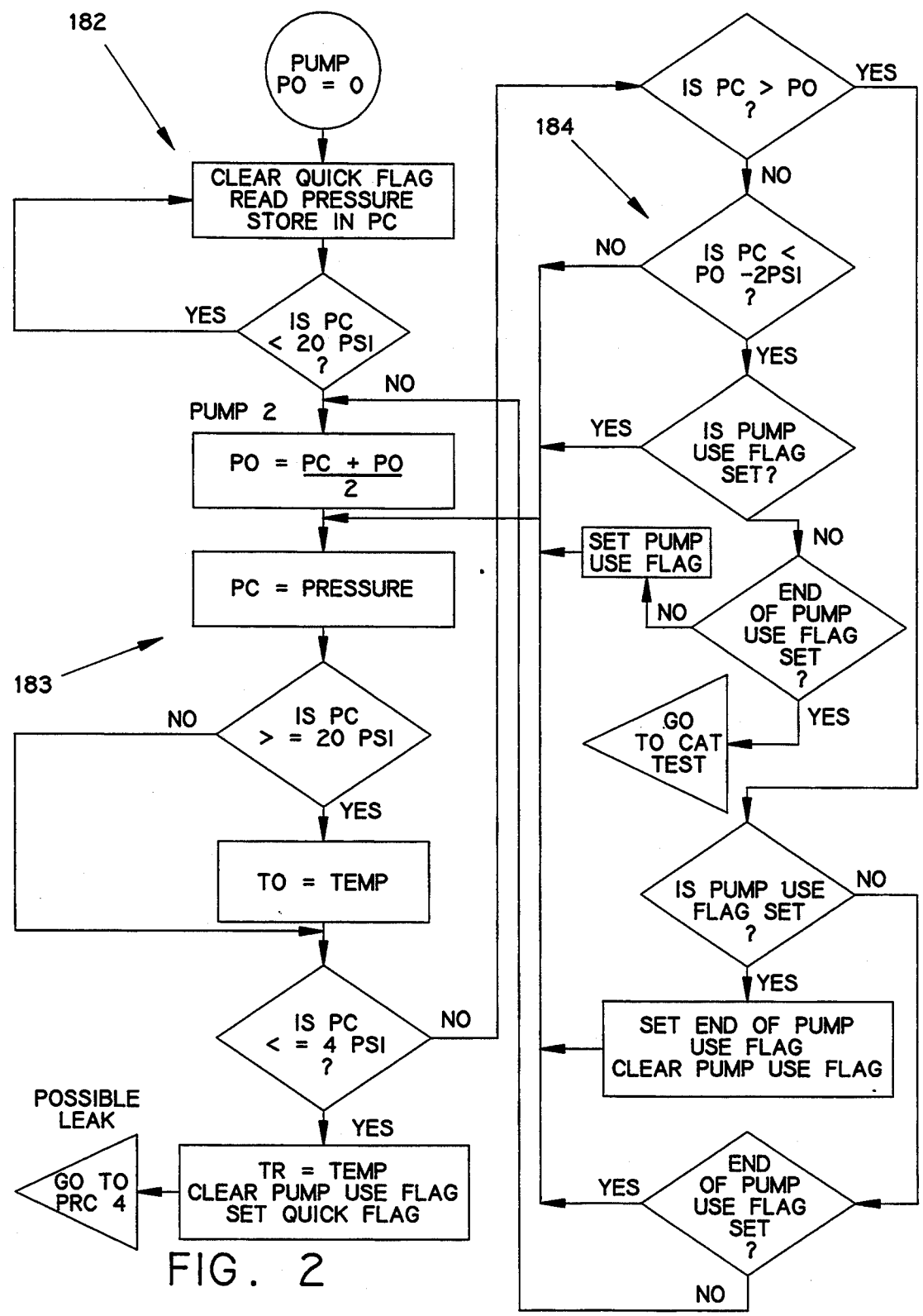
FIG. 2 is a flow chart of the preferred embodiment of the software program for sensing pump use.
Figure 3A:
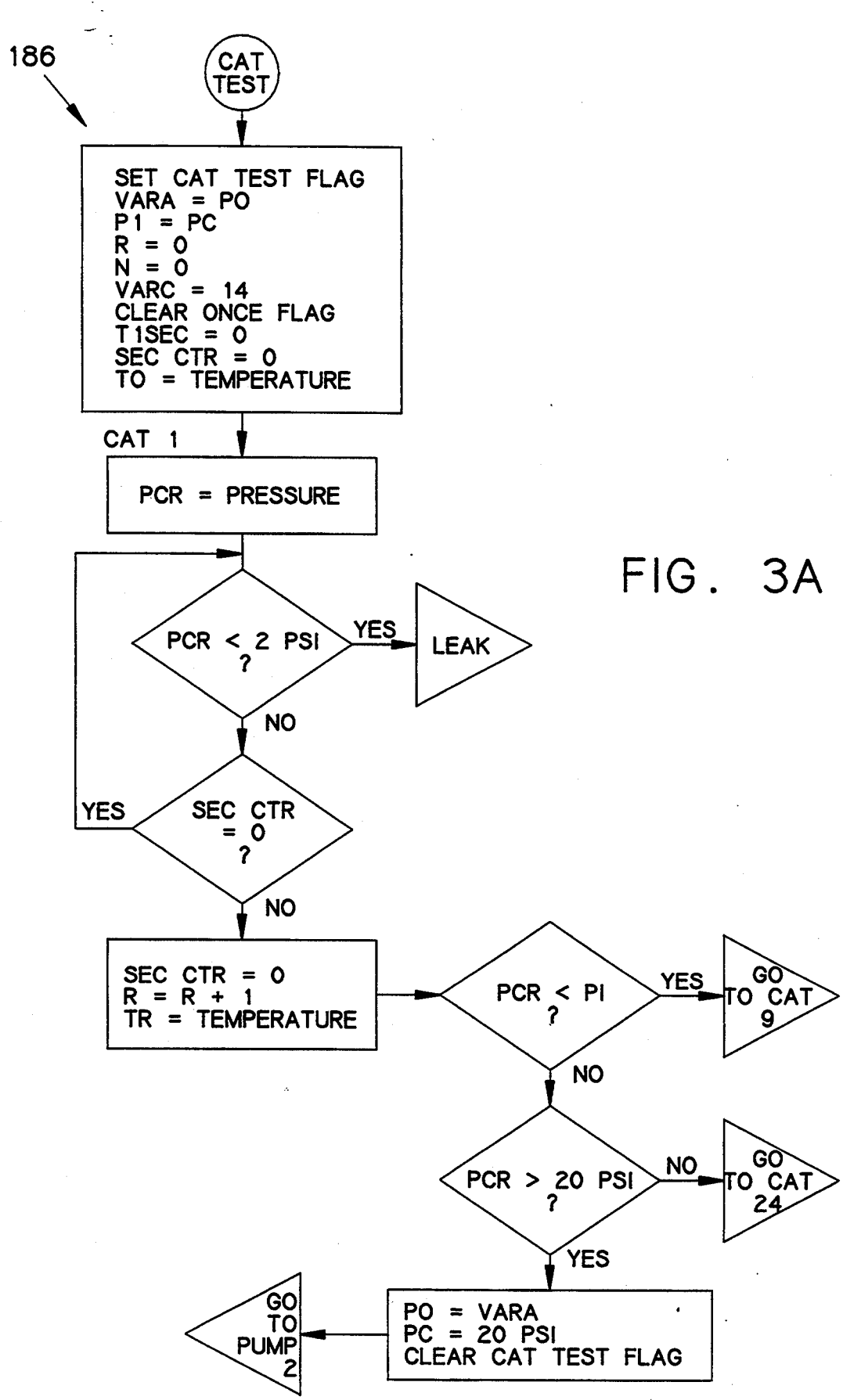
FIGS. 3A and 3B are a flow chart of the preferred embodiment of the software program for a catastrophic leak test.
Figure 3B:
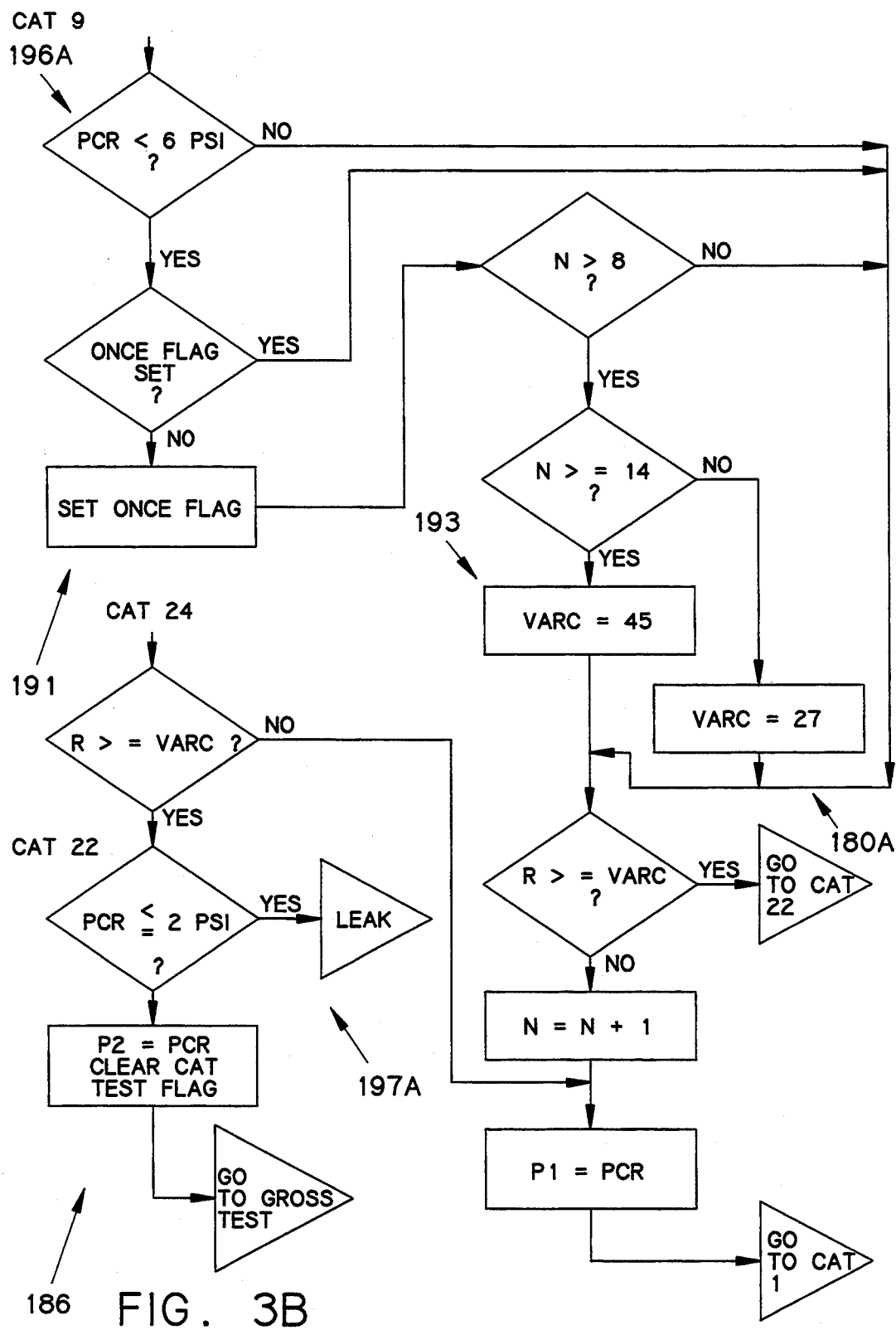

FIG. 2 shows the subprogram which senses the use of pump 53. Starting from upper left hand corner, the routine is initiated by setting the variable P0 equal to zero. The Quick Flag is then cleared and the pressure is read from pressure transducer 64 and stored as the variable PC. The program then pauses and rechecks the pressure and updates PC until the pressure reaches 20 psi. Referring to FIG. 6, the program will be at approximately the point 172 when this pressure is first reached. The program then recalculates P0 as (PC+P0)/2. The pressure is then read again and entered to update the variable PC. If PC is greater than or equal to 20 psi, the temperature is read from temperature transducer 71 and recorded as T0. If the pressure is less than 20 psi, the system is considered to be operating improperly, e.g., there is a defective pump or a leak, and the temperature T0 reading is skipped. If the pressure is less than or equal to 4 psi, this is a strong indication of a possible leak, and the program immediately initiates the Precision Test subprogram by reading the temperature and records it as TR (which variable is used in the Precision Test subprogram) clearing the Pump Use Flag and setting the Quick Flag, which tells the Precision Test subprogram that it was entered other than in the sequential fashion. Normally, the pressure will be above 4 psi and the pump subprogram will go to the top of the right-hand column of FIG. 2 where it asks if PC is greater than P0. Initially PC will be greater than P0, thus the program will proceed along the "Yes" branch and pass out the "No" branch at the very bottom of the right hand column. P0 will then be calculated again and the cycle will repeat. It is seen that P0 will quickly approach the average pressure along the curve from the point where it first reaches 20 psi to the current point. The cycle time of the program in this area is in the order of milliseconds, and thus PC will stay greater than P0 only so long as the curve continues to rise. Thus the program is looking for the drop at 160. This drop is an indication that the pump has been turned on and the liquid is being dispensed. When the pressure begins to decrease, PC will become slightly less than P0 and the program will pass down the "No" branch of the decision tree at the top of the right-hand column of FIG. 2 to the "Set Pump Use Flag" decision tree, and then on the next cycle pass through the "Yes" branch of the "Is Pump Use Flag Set?" decision tree. The program will continue cycling in this manner searching for the peak 168. When this peak is reached, PC will be greater than P0 and the program will again pass out the "Yes" branch of the decision tree at the top of the right hand column and set the End of Pump Use Flag and clear the Pump Use Flag. The program will then cycle through the "Yes" branch of the decision tree at the bottom of the right-hand column until PC again falls below P0. The program will then pass through the "No" branch of the "Is PC<P0−2 psi?" decision tree, continuing to cycle in the Pump loop as the pressure falls. This pause allows the artifacts and noise in the conduit to settle. When the pressure settles below P0−2 psi, the program control passes out of the Pump subprogram to the Cat Test program shown in FIGS. 3A and 3B.

The Cat Test (short for Catastrophic Test) is a relatively quick and crude test for large leaks. It normally takes between approximately 14 and and 45 seconds depending on the amount of air in the line. At the initiation of the test, the Cat Test Run Flag is set, the variable VARA is set to P0, the variable P1 is set to PC, The Once Flag is cleared, the variables R, N, T1SEC, and SEC CTR are set to 0, the variable VARC is set to 14, and the temperature is read and assigned to the variable T0. The T1SEC variable is a one second timer and the variable SEC CTR is a second counter which are incremented in a conventional timing subprogram. See U.S. Pat. No. 4,835,717. After the variables are set the pressure is read and assigned to PCR. If PCR is less than 2 psi, a leak has occurred and the Leak output program is activated. This program latches an off signal on the "DRY" output line (FIG. 1A) and an on signal on the "OIL" output line which will stay latched until the microprocessor 70 is reset. If there is no leak, the Cat Test sub program will pause at this point for one second as it cycles through the "Yes" branch of the "SEC CTR =0?" decision tree. When the SEC CTR variable is incremented to 1 by the timing subprogram, the SEC CTR variable is then reset to 0, R is incremented, and the temperature is read and assigned to the variable TR. The next decision tree, "PCR<P1?", essentially asks if the pressure has gone down since the start of the Cat Test subprogram. If the pressure has not gone down, the program asks if the pressure is greater than 20 psi. If it is, the variable VARA is set to P0, the variable PC is set to 20 psi, and the Cat Test Run Flag is cleared and the Pump subprogram is reentered at Pump 2 (FIG. 2). If the pressure has neither gone down nor is greater than 20 psi, the program is directed to the Cat 24 program branch (FIG. 3B) which leads to a relatively quick test and exit from the Cat Test subprogram to the Gross Test subprogram when the Cat Test program time has expired and the leak threshold has not been encountered. The program will in this case cycle through the Cat Test subroutine from Cat 1 to the lower right hand corner of FIG. 3B once each second until R>=VARC which has been set at 14. Thus, unless the pressure goes down, after 14 seconds, the leak output will be provided if PCR is greater than or equal to 2 psi or otherwise set P2 equal to PCR, clear the Cat Test Run Flag and exit to the Gross Test. Normally, however, the pressure will be falling in this part of the program, and the Cat Test subprogram will go to CAT 9 from FIG. 3A. The first decision tree after CAT 9 (FIG. 3B) asks if PCR is less than 6 psi. As long as the pressure continues to drop and stays at 6 psi or above, the subprogramn will cycle once each second, incrementing R and N After 14 seconds, R will equal VARC and the program will go to CAT 22 and exit to the Gross Test. If the pressure falls below 6 psi, the program will cycle through the upper portion of the right hand column in FIG. 3B once. This portion, starting with the "N>8?" decision tree, adjusts the time scale of the Cat Test depending on the slope of the pressure signature curve at 170. Since this slope depends on the amount of air in the conduit, this is a means 180A for compensating for the amount of gas in the conduit 54. If the fall to below 6 psi has taken place in less than 8 seconds, then the subprogram takes 14 seconds to cycle to CAT 22 and to either a leak output or to the Gross Test as when the pressure did not go down. If the fall has taken between 8 and 13 seconds, the variable VARC is stepped up to 27 and the subprogram cycles for twenty-seven seconds before going to CAT 22. If the fall has taken 14 or more seconds, then the variable VARC is set to 45 and the subprogram cycles for 45 seconds before going to CAT 22. Thus, the more air in the line, the longer the program takes to do the Catastrophic Test subprogram. This Catastrophic Test subprogram is designed to test for leaks of 10 gallons per hour or more.

Figure 4A:
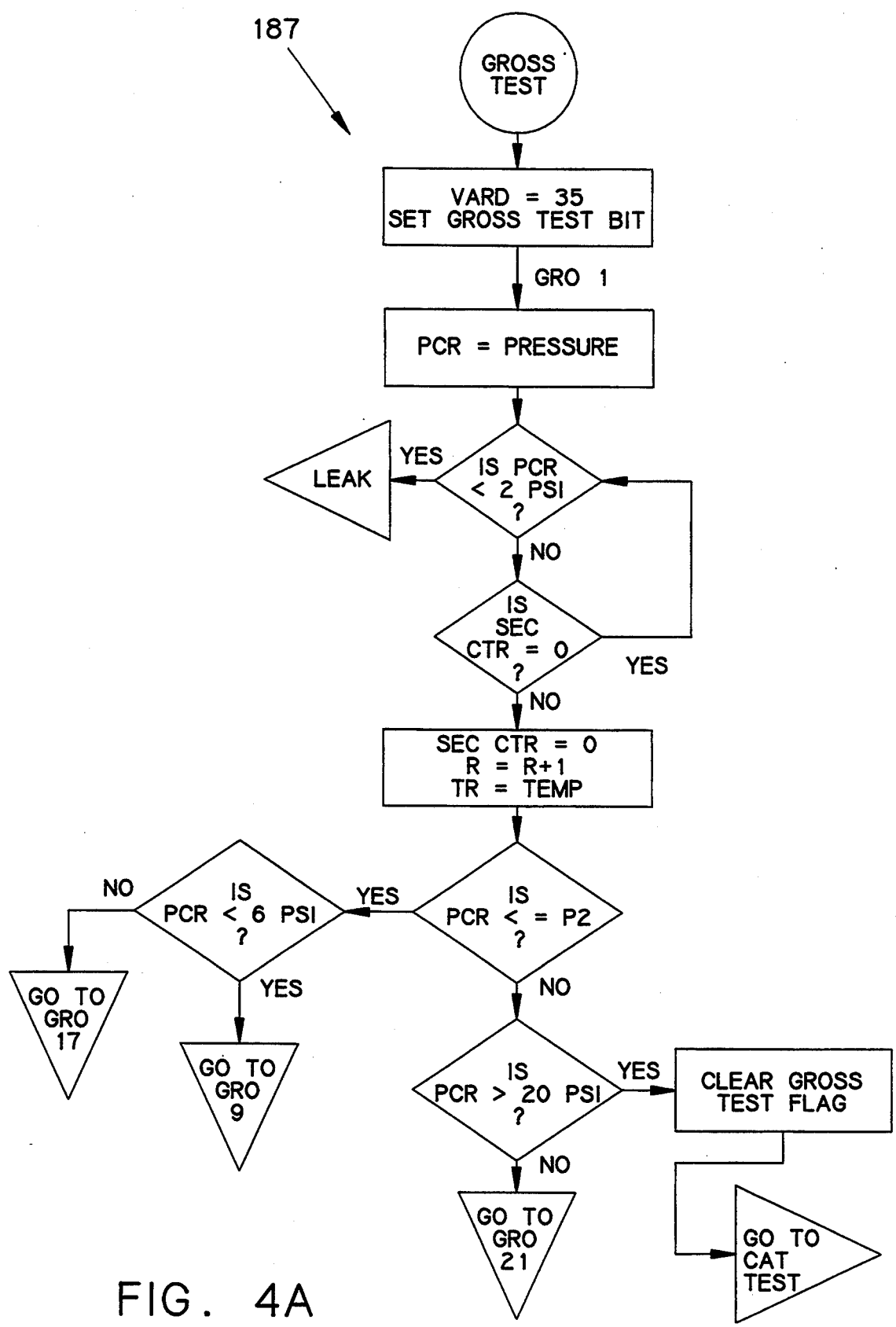
FIGS. 4A and 4B are a flow chart of the preferred embodiment of the software program for a gross leak test.
Figure 4B:
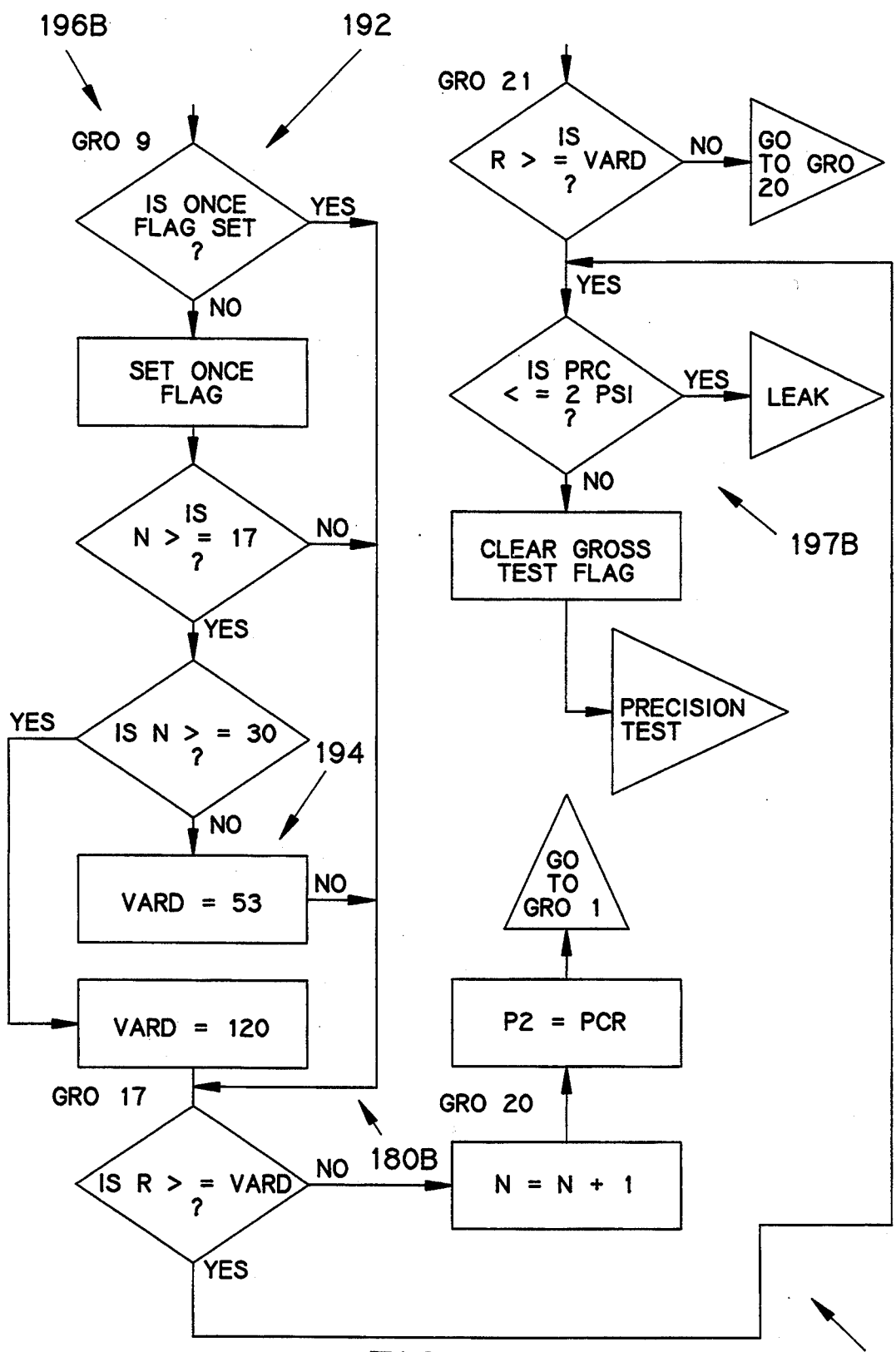

The Gross Test is shown in FIGS. 4A and 4B. This test is designed to test for leaks of 3 gallons per hour or more. This test is similar to the Catastrophic Test subprogram. It first sets the variable VARD to 35 and sets the Gross Test Flag, then reads the pressure and assigns it to the variable PCR. Then, it cycles for a second while it checks if the pressure has fallen below 2 psi. When a second has passed, it resets the SEC CTR variable to 0, increments R, and reads the temperature and assigns the value to the variable TR. If the pressure is not falling and is greater than 20 psi, it is likely the pump has turned back on, and the Gross Test Flag is cleared and the program cycles back to the Cat Test program, from whence it will quickly go back to the Pump subprogram if the pressure stays above 20 psi If the pressure is not falling but is 20 psi or less, the subprogram goes to GRO 21 at the top right-hand side of FIG. 4B. As long as the pressure does not fall, it will cycle through this part of the program to GRO 20 where the old PCR pressure is assigned to P2, then to GRO 1 where a new pressure is read and assigned to PCR and the cycle repeated. When R equals 35, at which time thirty-five seconds will have passed since the start of the Cat Test subprogram, the Gross Test subprogram will go to a leak output if the pressure has fallen to 2 psi or below, or otherwise exit to the Precision Test subprogram. If the pressure does fall, then the same result is reached as in the Cat Test subprogram, except here the time scale is adjusted to even longer times. If the drop to below 6 psi has taken less than 17 seconds, then the subprogram cycles for the 35 seconds as when the pressure does not change, and then goes to the Leak output subprogram if the pressure is 2 psi or lower and otherwise exits to the Precision Test subprogram. If the drop takes between 17 and 29 seconds, the sliding time scale is set to 53 seconds, and if it takes 30 or more seconds to drop below 6 psi, the sliding time scale is set to 120 seconds for the Gross Test. The program will then cycle until the 53 seconds or the 120 seconds has elapsed since the start of the Cat Test, then test for the pressure to be at 2 psi or below, and then exit to the Precision Test if it has not and go to the Leak subprogram to output the leak signal if it has.

Figure 5A:
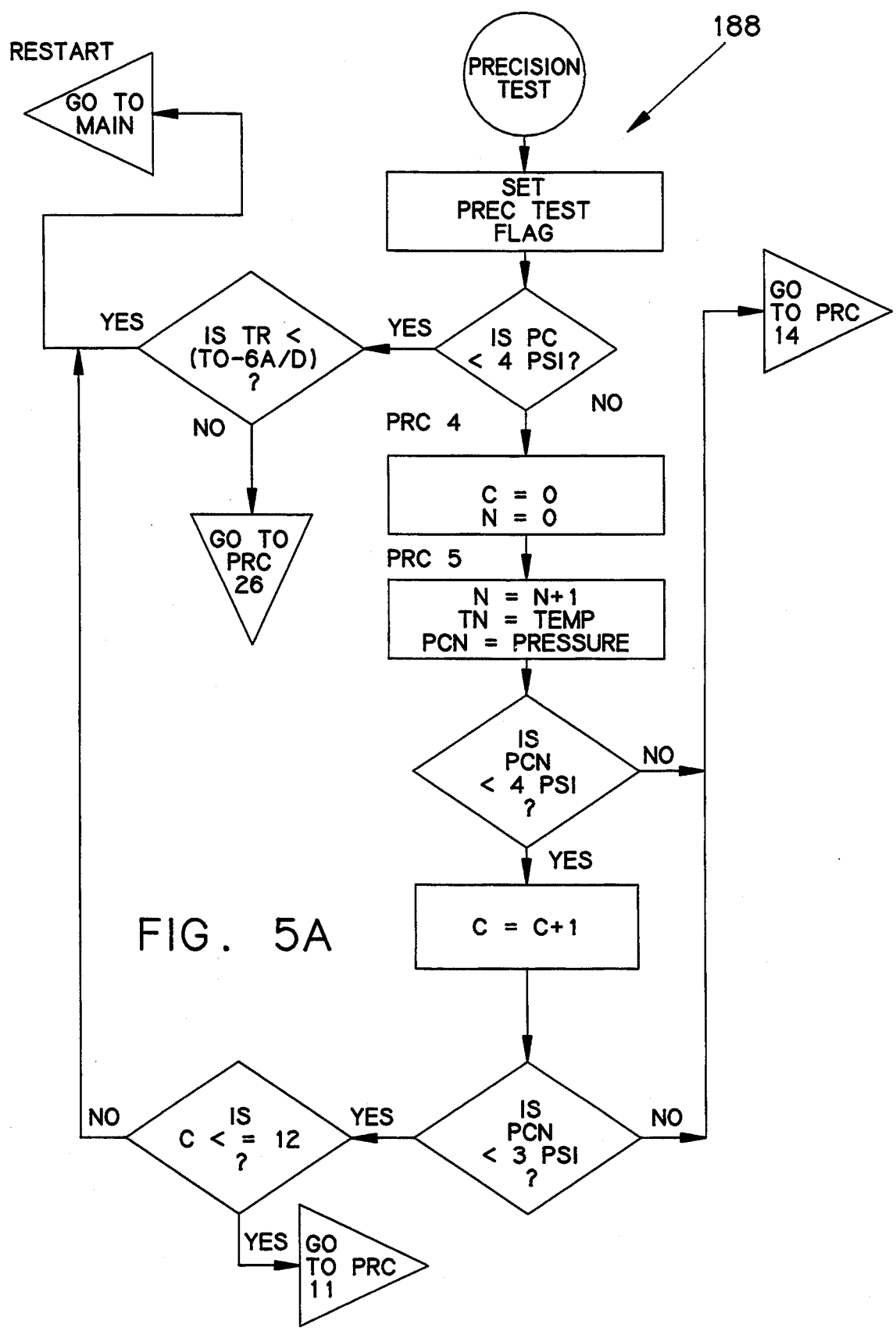
FIGS. 5A, 5B, and 5C are a flow chart of the preferred embodiment of software program for a precision leak test.
Figure 5B:
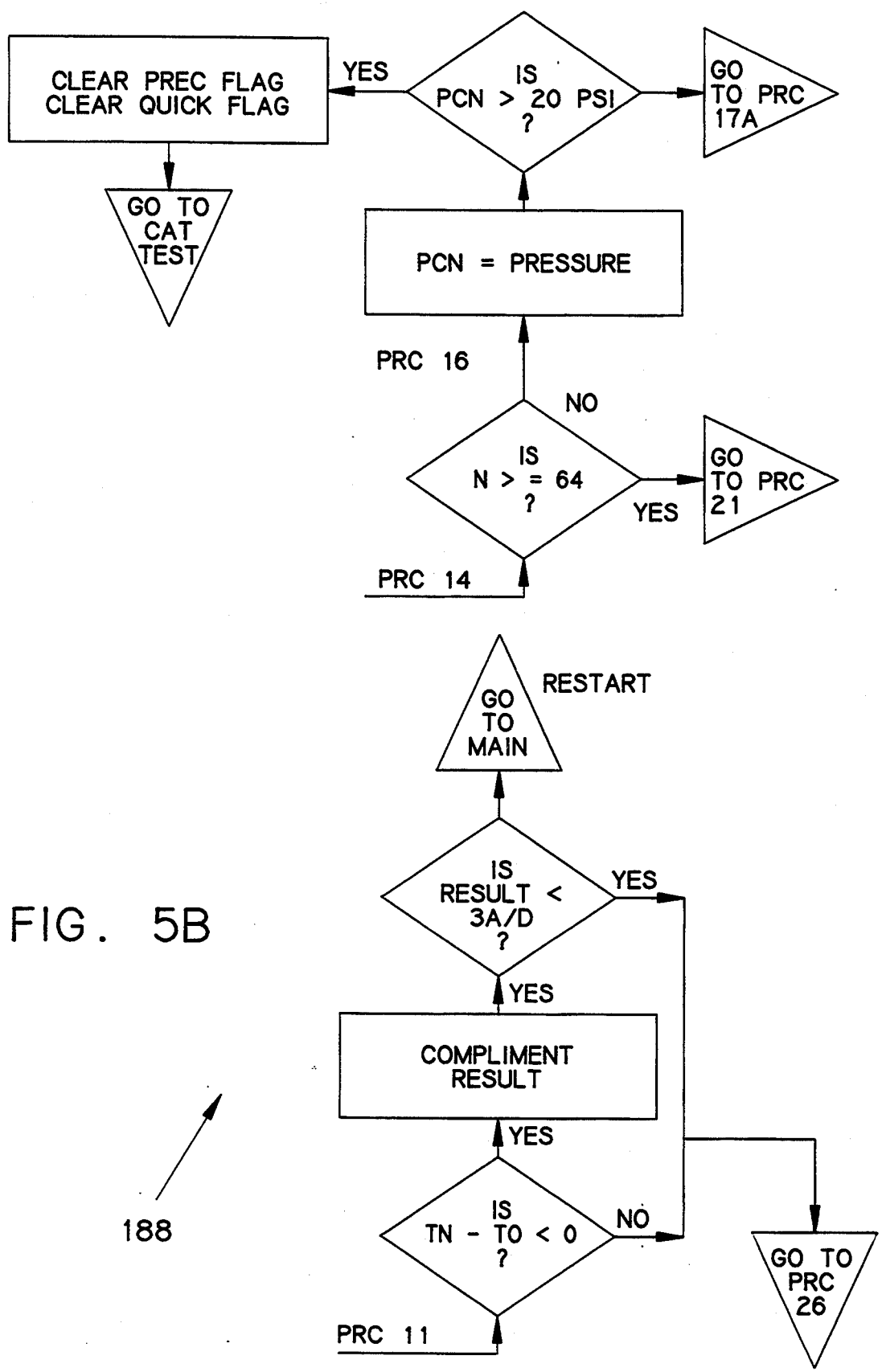
Figure 5C:
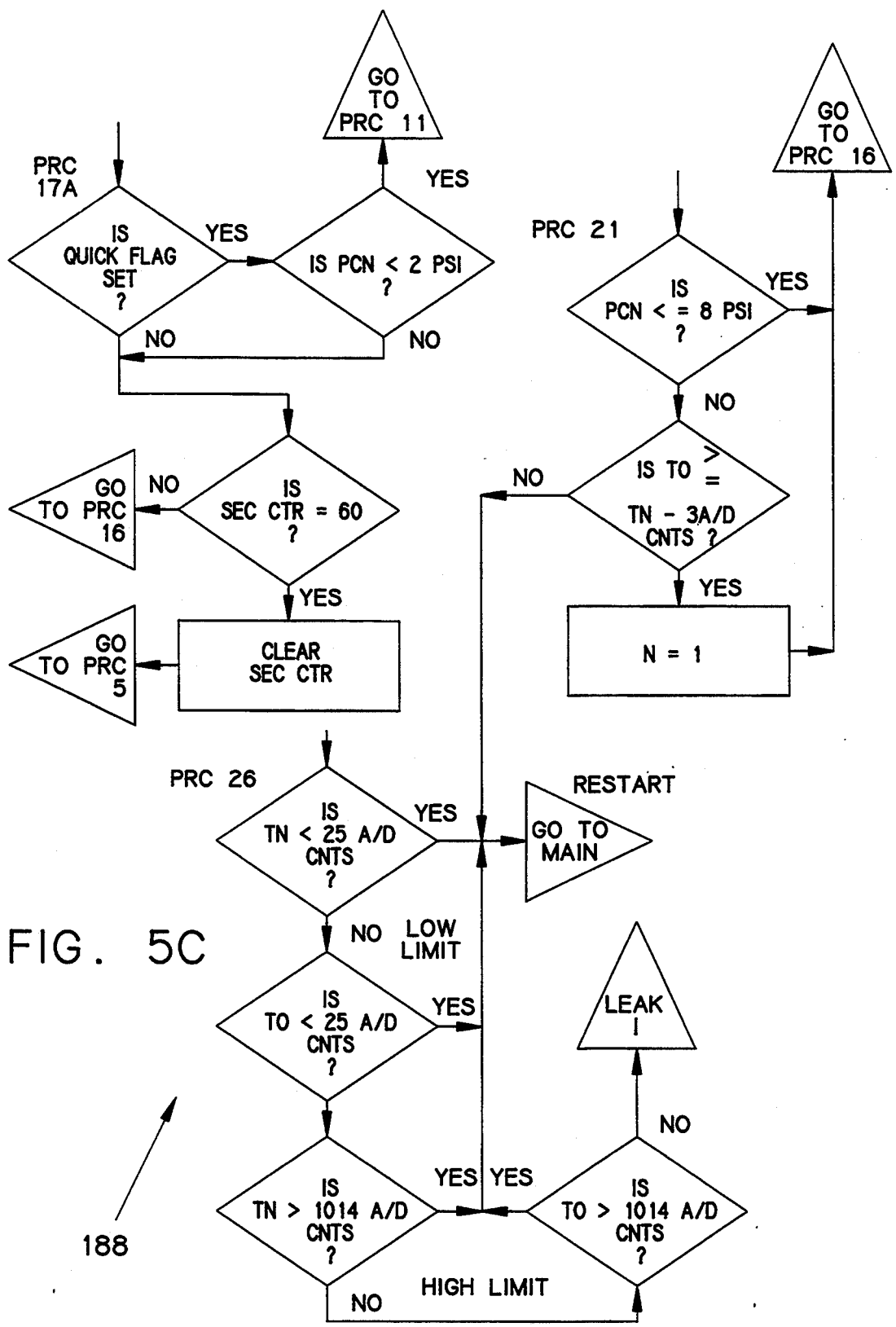

The Precision Test subprogram is shown in FIGS. 5A through 5C. It is designed to test for leaks as small as 0.05 gallons per hour. It takes much more time than the Catastrophic and Gross Tests, and therefor the effect of temperature changes in the liquid must be taken into account. At the start of the test, the Precision Test Flag is set and then if PC, the last pressure read in the Pump subprogram was less than 4 psi, the temperature change since that pressure was taken is examined. Generally, if the pressure was less than 4 psi in the Pump subprogram, it will exit immediately to PRC 4, so it will be rare, if ever that this path is taken. It is placed here as a safety precaution. On the temperature counter scale, a zero count represents 0 degrees Fahrenheit and each A/D count represents 0.1 degrees F. Thus the decision tree "Is TR<(T0−6A/D)?" asks if the temperature has fallen more than 0.6 degrees since the time when PC was last set equal to the pressure in the Pump subprogram. If the temperature has fallen 0.6 degrees or more, and the pressure was less than 4 psi when the Pump program was exited, the Precision Test won't be accurate, thus the program is exited back to the beginning of the Main program. If the temperature has not changed by 0.6 degrees, then the subprogram goes to PRC 26 in FIG. 5C. This part of the subprogram examines the temperatures T0 and TN and if the temperatures are too low, that is below 2.5 degrees F, or too high, that is above 101.4 degrees F, the subprogram exits to the Main program. This is because the A to D converter 76 will not provide a temperature signal below 0.2 degrees F or above 102.4 degrees F. Cutting off the test well within the range gives room for error. TR is not examined since the subprogram aborts if TR is not within 0.6 degrees of T0. If the temperature is within the range, a leak signal is output. Normally the pressure is above 4 psi when the Precision Test subprogram is entered and the subprogram will then set the variables C and N equal to 0 then increment N, set TN equal to the current temperature, and set PCN equal to the current pressure. If PCN is not less than 4 psi, which will generally be the case, the subprogram goes to PRC 14 in the middle of FIG. 5B. If N is less than 64, the pressure is read again and PCN is updated, and if PCN is greater than 20 psi, the pump has probably come back on and the Precision Test and Quick Flags are cleared and the program goes back to the Cat Test. As long as the pressure stays at 20 psi or below, the subprogram goes on to PRC 17A at the upper-left of FIG. 5C. If the Quick Flag has not been set, that is if the Precision Test program has not been entered from the Pump subprogram, then the program goes to PRC 16 if the second counter is less than 60, and if the second counter is equal to 60, it is cleared and the program goes back to PRC 5. The subprogram will thus continue cycling through PRC 16 and PRC 17A for a minute, then cycle through PRC 5, PRC 14, and PRC 17A once, then return to cycling through PRC 16 and PRC 17A for another minute, until N is equal to 64. Thus, as long as the pressure stays between 4 and 20 psi, the Precision Test subprogram will cycle for 64 minutes. It will then go to PRC 21, on the upper right in FIG. 5C. If PCN is greater than 8 psi, the temperature change is checked. If the change in temperature during the Precision Test is greater than 0.3 degrees F, the test may not be valid and the program goes back to the beginning of the Main program. If the temperature is still within range, N is set back to 1 and the subprogram cycles for another 63 minutes. If the pressure is less than or equal to 8 psi, the program goes back to PRC 16 and cycles for another minute before coming back and checking to see if the pressure has risen above 8 psi. As long as the pressure doesn't go above 20 psi, or above 8 psi and the temperature change throws it back to the Main program, the subprogram will continue to cycle until the pressure falls below 4 psi. When the pressure falls below 4 psi, the subprogram enters the test loop at the bottom of FIG. 5A, where a definitive test is performed. First C is incremented, then the pressure is checked and if it is not below 3 psi, the subprogram goes back through the PRC 21 loop (via PRC 14) and cycles for another minute, then comes back and increments C and checks if the pressure had fallen below 3 psi again.

It continues incrementing C once each minute until the pressure falls below 3 psi. Then it checks to see how long the pressure took to fall from just below 4 psi to just below 3 psi. If this took longer than 12 minutes, there is no leak above 0.05 gallons per hour (or the temperature is affecting the results) and the program returns to the Main program. If it took less than 12 minutes to fall between less than 4 psi and less than 3 psi, the subprogram goes to PRC 11 where it checks for the sign of TN-T0. If the sign is negative, the result is complimented and its absolute magnitude is compared to 3A/D. If it is not less than 3A/D, then the temperature has been decreasing so much that it can account for the measured drop in pressure, and the test is not valid, therefor the program goes back to the Main program. If the result is less than 3A/D, the decrease is not sufficient to account for the drop in pressure, and the test continues to PRC 26. If the temperature is increasing, the leak is even larger than it would have been i f the temperature had stayed the same, and the test also continues to PRC 26. As discussed above, the subprogram after PRC 26 checks to be sure the temperatures TN and T0 are within the range within which the A/D converter 76 provides temperatures, and if they are, a leak is indicated. If they are not, the program goes back to the Main program. If the Quick flag is set and the pressure is not less than 4 psi, then each time the program is about to go through one of the minute cycles discussed above (see the top left side of FIG. 5C), the subprogram checks to see if the pressure has fallen below 2 psi. If so, it immediately goes to PRC 11. If not, it cycles as though the Quick Flag were not set.

The invention operates as follows. The line leak probe test 60 is mounted on conduit 54 with the pressure transducer 64 in mechanical contact with the liquid in the line and the temperature transducer 7 1 in thermal contact with the liquid. The microprocessor 70 within the probe 60 monitors the pressure transducer at time intervals of the order of milliseconds. When a customer or other person desires to dispense liquid, the pump 53 is turned on by a manual control 204 on dispenser 55 which communicates with the pump 53 via cable 66. Dispenser nozzle valve 207 in dispenser hose 203 is opened manually, and provided pump 53 has sufficient pressure to overcome check valve 202 contained in the pump, liquid is dispensed via hose 203. When the dispensing is completed, the nozzle valve 207 is closed and the pump 53 is turned off. The pressure in conduit 54 diminishes until the threshold pressure of check valve 202 is reached, at which time the pressure in conduit 54 is maintained by check valve 202, provided it does not leak. The probe 60 responds to the pump being turned on and off as described above, and proceeds to the Catastrophic, the Gross, and the Precision Tests. Generally the Precision Test will only be completely run when the pump is not used over a long period, such as during the night. Periodically, depending on how many probes there are, the monitor 58 interrogates probe 60 by putting out the probe number on inputs A0 through A3 via cable 65. The microprocessor periodically checks the inputs A0 through A3 and compares the signal on them to the signal on pins 5 through 8. When the signals match, the microprocessor sends the probe status back to the monitor via cable 65. As long as there is no leak, the status is an on signal on the "DRY" output No. 2 and an off signal on the "OIL" output No. 3 . When a leak occurs, an off signal is placed on the "DRY" output and an on signal is placed on the "OIL" output No. 3. The monitor is generally programmed to disable the pump 53 off when a leak is reported, thus the leak signal may also be termed a pump disable signal. When the leak is fixed, the reset button 77 is pressed and released. When the reset button 77 is pressed, an electrical signal with a rising edge is impressed on inverter 79 and a falling edge signal is inputted into pin No. 1 of microprocessor 70. This shuts the microprocessor off. As long as switch 77 is held in, the microprocessor remains off and no signals are output on the "DRY" and "OIL" outputs. The monitor 58 responds to no output with an error indication on error output means 63. It may be programmed to either leave the pump 53 on or disable it in response to an error output. Switch 77 includes means 200 for returning the switch to its unpressed position when it is released, thus when the switch is released, it opens and a negative edge signal is impressed on inverter 79 which inputs a positive edge signal to microprocessor pin No. 1, which resets the microprocessor 70. The Main program commences and the leak test program described above is shortly run. If the leak has not been fixed, the leak signal, which is a pump stop signal under normal programming of the monitor 58, will be output again upon interrogation of probe 60 by monitor 58. If the leak has been fixed, the system then proceeds normally.

It is a feature of the invention that the line leak test probe 60 comprises leak test means 190 (the microprocessor 70 and the software stored within it) which includes pump use means 182 for determining whether or not the pump is in use and for using this information in assisting in testing for leaks. The information about pump use is useful in testing for leaks in several ways. For example, it is useful in making it possible to wait until after the pump has been turned off to do accurate testing for leaks and in terminating tests promptly if pumping recommences. It is also useful in starting timing sequences for analyzing the rate of pressure decline after the pump has been turned off. Another way it is useful is in enabling temperature readings to be taken at initiation of the timing sequences to determine if the leak tests are valid. The pump use means 182 includes means 183 for determining the average pressure while the pump is running and waiting means 184 for waiting until the pressure in the conduit 54 has settled before accurate testing for leaks is commenced.

Another feature of the invention is that the leak tests performed are based on the time rate of change of the pressure. The final Precision Test is based on the time rate of pressure change over the range from just less than 4 psi to just less than 3 psi. If this rate is greater than 5 psi per hour, then a leak signal is output, provided the temperature is within the correct range. While the Castasrophic and Gross Tests both indicate a leak if the pressure falls below a value of 2 psi, these are also pressure drop rate tests in that if they don't drop below 2 psi within predetermined times, that is if the rate of pressure drop is below a predetermined rate, the Precision Test is entered.

Another feature is that the invention includes three different tests: a first test means 186, the Catastrophic Test, tests for relatively large leaks over a first time, which may be 14, 27 or 45 seconds depending on the amount of air in the conduit 54; a second test means 187, the Gross Test, tests for smaller leaks over a second time, which may be 35, 53 or 120 seconds depending on the amount of air in the conduit 54; a third test means 188, the Precision Test, tests for relatively small leaks over a third time, which is at least 12 minutes and generally is longer. If the pressure drops below 4 psi while the pump is running or falls below 2 psi early in the Catastrophic Test, the probe will test for a leak over a fourth time which is shorter than even the first time. This fourth time can be on the order of milliseconds and will depend on how fast the pressure falls.

Another feature of the invention is that it includes gas compensation means 180A, 180B. Gas compensation means 180A compensates for gas, such as air, in the conduit 54 in the Catastrophic Test, while gas compensation means 180B does the same in the Gross Test. Each gas compensation means 180A, 180B includes a gas effect means 191, 192 respectively, and a sliding time scale means 193, 194 respectively. The gas effect means 191, 192 determines the effect of the gas on the rate of fall of the pressure, then the sliding time scale means 193, 194 adjusts the amount of time over which the respective test is performed depending on the effect determined.

A related feature of the invention is that two different pressure change rates are measured. A first rate means, such as 196A in the Catastrophic Test, measures the rate of pressure change essentially while the pressure falls along the slope 170 of the signature curve, while the second rate means, such as 197 in the Catastrophic Test, essentially measures the rate of pressure change after the level 171 determined by the check valve 202 should have been reached. The gas estimating means, such as 191, comprises the first rate means, such as 196A. The rate determined by the first rate means, such as 196A, is used to adjust the time over which the pressure change is measured by the second rate means, such as 197A. While the times over which the two rates are measured overlap somewhat since the second rate is begun to be measured before the first rate measurement is finished, these two do not interfere and can be distinguished since an increase in air in the conduit 54 decreases the first rate, while an increasing leak increases the second rate.

Another feature of the invention is that it includes a prevent means 205 for preventing the reset signal from being continuously provided. This prevents a person from laying a brick or other object on the reset button and keeping the pump 53 running even when there is a leak, if the programmer of the monitor 58 so desires. That is, the programmer of the monitor 58, generally the owner or manager of the liquid storage and dispensing system 51, may determine if he or she desires this feature by appropriately programming the monitor's 58 response to an error signal. The key point here, is that the microprocessor is reset only when a signal is applied that is opposite in sign to the signal output when the reset switch is manually pressed. Thus the reset switch must be released to reset the microprocessor. In this manner the invention permits the owner of a conventional monitor to effectively control the use of the liquid storage and dispensing system when leaks are present.

A novel line leak test probe that provides the ability to sense the use of the pump 53 and to use this information to assist in testing for leaks, and which has many other features and advantages has been described. It is evident that those skilled in the art may now make numerous uses and modifications of and departures from the specific embodiments described herein without departing from the inventive concepts. For example, other pump sensing methods be used, such as by sensing vibrations in the conduit 54 caused by the pump being on. Equivalent electrical and mechanical parts may be used. Additional features may be added. Consequently, the invention is to be construed as embracing each and every novel feature and combination of features present in and/or possessed by the line leak test probe described.

What is claimed is:

1. A line leak test probe for use in a liquid storage and despensing system which includes a pump for pumping said liquid, said probe comprising:

pressure transducer means for providing an electrical signal representative of the pressure in a liquid conduit; and leak test means responsive to said electrical signal for testing said system for leaks and for providing an output signal indicative of leak; said leak test means including:

storage means for storing one or more predetermined conditions related to whether or not said pump is in use; and pump use means communicating with said storage means for determining whether said pump is "off" prior to beginning a leakage test by distinguishing between product line pressure variations caused by despensing said liquid and product line pressure decay caused by a leak through continuous pressure monitoring to create a pressure running average.

2. A line leak test probe as in claim 1 wherein said pump use means includes waiting means for waiting until the pressure in said conduit has stabilized after said pump has been shut off before testing for leaks.

3. A line leak test probe as in claim 2 wherein said pump use means further comprises means for determining an average pressure while said pump is running and said means for determining comprises means for waiting until said pressure has stabilized a predetermined amount below the average pressure before testing for leaks.

4. A line leak test probe as in claim 3 wherein said predetermined amount comprises 2 psi.

5. A line leak test probe as in claim 3 wherein said leak test means includes means for testing for leaks while said pump is running if said pressure suddenly falls below a low pressure threshold.

6. A line leak test probe as in claim 7 wherein said first predetermined pressure is 20 psi and said second predetermined pressure is 4 psi.

7. A line leak test probe as in claim 1 wherein said pump use means comprise means for determining the average pressure while said pump is running.

8. A line leak test probe as in claim 7 wherein said one or more predetermined conditions comprises the condition that the pressure is greater than a predetermined pressure.

9. A line leak test probe as in claim 8 wherein said predetermined pressure is 20 psi.

10. A line leak test probe as in claim 7 wherein said one or more predetermined conditions comprises the condition that the pressure rises above said average pressure.

11. A line leak test probe as in claim 1 wherein said one or more conditions correspond to a pressure signature which the pressure normally follows when said pump is turned on, liquid is dispensed, and said pump is shut off in sequence.

* * * * *